United States Patent [19]

Yamanari et al.

[11] Patent Number: 4,526,743

[45] Date of Patent: Jul. 2, 1985

[54] CONTAINMENT VESSEL FOR A NUCLEAR REACTOR

[75] Inventors: Shozo Yamanari; Tetsuo Horiuchi; Toshihiko Sugisaki; Kenji Tominaga, all of Hitachi, Japan

[73] Assignee: Hitachi, Ltd., Tokyo, Japan

[21] Appl. No.: 172,950

[22] Filed: Jul. 28, 1980

Related U.S. Application Data

[63] Continuation of Ser. No. 744,239, Nov. 23, 1976, abandoned.

[30] Foreign Application Priority Data

Dec. 26, 1975 [JP] Japan ................... 50-154940

[51] Int. Cl.$^3$ .............................................. G21C 9/00
[52] U.S. Cl. ................................................. 376/283
[58] Field of Search .......................... 376/277, 283, 284

[56] References Cited

U.S. PATENT DOCUMENTS

| 3,115,450 | 12/1963 | Schanz | 176/38 |
| 3,253,996 | 5/1966 | Bond, Jr. et al. | 176/37 |
| 3,287,226 | 11/1966 | Webb | 176/38 |
| 3,397,113 | 8/1968 | Stafford | 176/37 |
| 3,605,362 | 9/1971 | Sweeney | 176/38 |
| 4,022,655 | 5/1977 | Gaouditz et al. | 176/38 |

FOREIGN PATENT DOCUMENTS

| 1514165 | 5/1969 | Fed. Rep. of Germany | 176/38 |
| 1589770 | 8/1970 | Fed. Rep. of Germany | 176/38 |
| 1564289 | 9/1971 | Fed. Rep. of Germany | 176/38 |
| 2023343 | 12/1971 | Fed. Rep. of Germany | 176/37 |
| 2203107 | 8/1973 | Fed. Rep. of Germany | 176/37 |
| 49-43091 | 4/1974 | Japan . | |

OTHER PUBLICATIONS

Nuclear Eng. Int. 1/75, pp. 43–47, Smith.

Primary Examiner—Harvey E. Behrend
Attorney, Agent, or Firm—Antonelli, Terry & Wands

[57] ABSTRACT

A containment vessel for a nuclear reactor having a dry well for mounting therein a pressure vessel for containing the nuclear reactor, a pressure suppressing chamber having a pool of coolant therein, and a vent pipe device for releasing therethrough into the pool of coolant within the pressure suppressing chamber steam which will be produced as a result of the occurrence of an accident and escape into the dry well. The vent pipe device includes a plurality of vent pipe members inserted in the pool of coolant within the pressure suppressing chamber and each having at least one exhaust port opening in the coolant. The vent pipe members are divided into a plurality of groups in such a manner that the vent pipe members of different groups differ from one another in the length of submerged portions of the vent pipe members interposed between the liquid of the coolant within the pressure suppressing chamber and the exhaust ports of the vent pipe members.

9 Claims, 16 Drawing Figures

FORCE OF IMPACT EXERTED BY RISING LIQUID LEVEL

CONTAINMENT VESSEL FOR A NUCLEAR REACTOR

This is a continuation of application Ser. No. 744,239 filed Nov. 23, 1976, now abandoned.

BACKGROUND OF THE INVENTION

This invention relates to containment vessels for nuclear reactors, and more particularly to a containment vessel for a nuclear reactor which is adapted to suppress a sudden increase in the pressure applied to the pressure suppressing chamber by air bubbles formed in the coolant within the pressure suppressing chamber at the initial stages of occurrence of an accident involving the escape of coolant from the nuclear reactor.

Generally, a containment vessel for a boiling-water reactor is known which comprises a dry well for mounting therein a pressure vessel for the reactor, a pressure suppressing chamber having a pool of coolant therein, and a vent pipe device maintaining the dry well in communication with the coolant within the pressure suppressing chamber whereby steam of high temperature and high pressure generated by an accident involving the escape of the coolant from the reactor can be released from the dry well into the coolant within the pressure suppressing chamber. The vent pipe device comprises a plurality of vent pipe members inserted in the coolant within the pressure suppressing chamber and each having at least one exhaust port opening in the coolant. The vent pipe members are constructed and arranged such that, even if the pressure in the dry well becomes lower than the pressure in a space formed above the liquid level of the coolant within the pressure suppressing chamber, the exhaust ports of the vent pipe members are immersed in the coolant within the pressure suppressing chamber at all times. This type of containment vessel for a nuclear reactor is disclosed, for example, in the Japanese Patent Gazette of Laid-Open Patent Application No. 43091/74 of Apr. 23, 1974, issued for an application filed by Hitachi Ltd., to which the present invention has been assigned.

In the event that an accident involving the escape of coolant from the pressure vessel of a reactor occurs in the aforementioned nuclear reactor containment vessel due to a failures of the piping system or some other trouble the space within the dry well will be filled with steam of high temperature and high pressure. Such steam will be caused to pass through the vent pipe members and to be released through the exhaust ports into the coolant or cooling water within the pressure suppressing chamber so that the steam may be condensed. This permits a rise in the pressure in the dry well to be avoided. However, in the initial stages of occurrence of an accident involving the escape of coolant from the nuclear reactor, non-condensable gas or air existing in the space in the dry well will be first released under high pressure into the cooling water in the pressure suppressing chamber through the vent pipe members. Therefore, a high pressure will be suddenly applied, though transiently, to the pressure suppressing chamber by bubble formation in the cooling water. This phenomenon occurs in about 0.3 to 0.7 second after the occurrence of the accident causing the escape of coolant from the nuclear reactor. There is the danger of the pressure suppressing chamber being damaged if a high pressure is suddenly applied thereto, even if the phenomenon is transient, thereby reducing the safety of the nuclear reactor containment vessel.

SUMMARY OF THE INVENTION

This invention has as its object the provision of a containment vessel for a nuclear reactor of an acceptable safety level which obviates the aforementioned disadvantage of the prior art by inhibiting a sudden increase in the pressure applied transiently to the pressure suppressing chamber in initial stages of the occurrence of an accident involving the escape of coolant from the reactor.

The outstanding characteristic of the invention is that the containment vessel for a nuclear reactor comprises a vent pipe device including vent pipe members divided into a plurality of groups in such a manner that the vent pipe members of different groups differ from one another in the length of submerged portions of the vent pipe members interposed between the liquid level of the coolant within the pressure suppressing chamber and the exhaust ports of the vent pipe members. The length $h_n$ of the submerged portion of a vent pipe member between the liquid level of the coolant and the exhaust port of the vent pipe member, which is in the nth order by starting from the pipe of the shortest submerged length $h_1$, is preferably determined by the formula:

$$h_n = h_1 + (n-1)\Delta h$$

where $\Delta h = h_1$ when the vent pipe members are divided into 2 groups, and $\Delta h = (h_m - h_1)/m - 1)$ but $\Delta h \leq h_1$ when the vent pipe members are divided into m more than 2 groups. Each vent pipe member may be formed with one exhaust port at its lower end or with a pair of exhaust ports disposed in its side wall near the lower end thereof in diametrically opposed positions.

When this invention is applied to a nuclear reactor containment vessel of the over-under type (Mark-II type), communicating means is preferably provided to permit an internal space formed in the pedestal to communicate only with a space formed above the coolant in the pressure suppressing chamber. Additionally, the vent pipe members are preferably arranged such that the vent pipe members of a plurality of groups having submerged portions of different lengths interposed between the liquid level of the coolant in the pressure suppressing chamber and the lower ends of the vent pipe members are disposed symmetrically with respect to the center line of the pedestal.

DESCRIPTION OF THE PREFERRED EMBODIMENTS

The invention will first be described with reference to an embodiment shown in FIG. 1 wherein the reference numeral 10 generally designates a containment vessel of the over-under type (Mark-II type) usually used with a boiling-water type nuclear reactor. The containment vessel 10 comprises a dry well 12 for mounting therein a pressure vessel 11 for containing a nuclear reactor, and a pressure suppressing chamber 14 disposed below the dry well 12 and containing therein a pool of coolant 13. The dry well 12 and the pressure suppressing chamber 14 are separated in airtight relationship by a partition 15 which serves as both a floor of the dry well 12 and a top wall of the pressure suppressing chamber 14. Disposed in the center of the containment vessel 10 and extending vertically through the partition 15 from the bottom of the pressure suppressing chamber 14 to an internal space 17 of the dry well 12 is a pedestal 16 which supports the pressure vessel 11 for containing the nuclear reactor. The portion of the pedestal 16 which is disposed within the pressure suppressing chamber 14 has formed therein an internal space 18 which is maintained, through openings 19 and 20 formed in the pedestal 16 in vertically spaced relationship, in communication with a space 22 formed above a liquid level 21 of the coolant 13 in the pressure suppressing chamber 14 and the pool of coolant 13 respectively.

A plurality of downwardly extending vent pipe members 23 and 24 are attached at one end thereof to the partition 15 and arranged in a manner such that the vent pipe members 23 and 24 are disposed annularly about the center line of the pedestal 16 and spaced equidistantly from one another. The vent pipe member 23 and 24 communicate at upper ends thereof with the internal space 17 of the pedestal 16 and include lower end portions which are submerged in the pool of coolant 13 in the pressure suppressing chamber 14.

The vent pipe members 23 and 24 are formed at lower ends thereof with exhaust ports 25 and 26 respectively. The submerged lower end portions of the vent pipe members 23, which extend from the liquid level 15 of the coolant 13 to the exhaust ports 25 of the vent pipe members 23 each have a length $h_1$ which differs from the length $h_2$ of each of the submerged portions of the vent pipe members 24 which extend from the liquid level 15 to the exhaust ports 26 of the vent pipe members 24. In the embodiment shown and described, $h_1 < h_2$. The relation between $h_1$ and $h_2$ is preferably $h_2 = 2h_1$ for a reason subsequently to be described.

Although not shown, spray nozzles may be provided in the internal space 17 of the dry well 12 for ejecting cooling water therefrom for the purpose of spraying water and condensing steam released into the space 17, in the event an accident involving the escape of cooling water in the pressure vessel 11 of the reactor occurs, for example. If this is the case, the internal pressure of the space 17 will become lower than the pressure in the space 22 between the partition 15 and the liquid level 21. In some cases, this phenomenon of lowered pressure in the space 17 may cause the cooling water 13 to be sucked up through the vent pipe members 23 and 24 and at the same time cause the liquid level 15 to be lowered, with the result that the exhaust ports 25 of the vent pipe members 23 having the submerged lower portions of the shorter length will be exposed above the liquid level 21. When such exhaust ports are exposed above the liquid level, the quantity of cooling water 13 sucked up through the vent pipe members 23 will be harled vigorously upon the liquid level 21 as soon as the pressure in the space 17 of the dry well 12 is restored to its normal level. Thus there are possibilities of this phenomenon raising a problem with regard to the safety of the pressure suppressing chamber 14.

In order to prevent a reduction of the pressure in the space 17 of the dry well 12 below the pressure in the space 22 between the partition 15 and the liquid level 21, the vent pipe members 23 and 24 are each provided with a known vacuum breaking valve (not shown) for preventing the reduction of the pressure in the space 17 below the pressure in the space 22. In any case, the lengths of the submerged portions of the vent pipe members 23 and 24 are determined such that the exhaust ports 25 of the vent pipe members 23 having the shorter submerged portions are immersed in the pool of cooling water 13, even if the internal pressure of the space 17 of the dry well 12 becomes lower than the pressure in the space 22 in the pressure suppressing chamber 14.

More specifically, when the vacuum breaking valves are used, the internal pressure of the space 17 becomes slightly lower than the pressure in the space 22 due to a pressure loss caused by these valves and depending on the pressure at which these valves are set. By taking these facts into consideration, the length $h_1$ of the submerged portions of the vent pipe members 23 extending from the liquid level 21 to the exhaust ports 25 is determined by using the following formula:

$$h_1 > (\alpha/\gamma A)(P_2 - P_1)$$

where A is the surface area of the liquid level 21; α is the total of cross-sectional areas of flow passages through the bores of all the vent pipe members 23 and 24; γ is the specific gravity of the cooling water 13; $P_1$ is the lowest absolute pressure in the space 17; and $P_2$ is the absolute pressure in the space 22.

The characterizing feature of the present invention is that the vent pipe member 23 and 24 divided into a plurality of groups are arranged such that the vent pipe members of different groups differ from one another in the length of submerged portions of the vent pipe members interposed between the liquid level of the pool of cooling water in the pressure suppressing chamber and the exhaust ports of the vent pipe members. This feature of the invention is based on a study carried out on the pressure transiently applied to the pressure suppressing chamber through the vent pipe members 23 and 24 in the event that an accident involving the escape of cooling water from a nuclear reactor occurs. The results obtained in this study will now be described with reference to FIGS. 2(A) to 2(D).

Figures 2A, 2B:
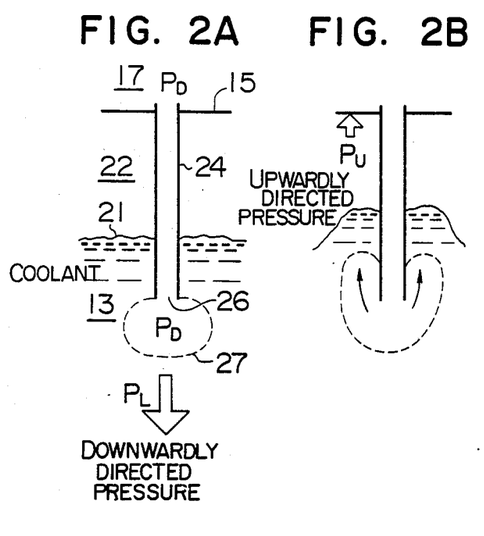
FIG. 2(A) to FIG. 2(D) are views in explanation of the proccess in which pressure is transiently applied to the pressure suppressing chamber of a nuclear reactor containment vessel by a bubble formed in the coolant in the pressure suppressing chamber by non-condensible gas released thereinto through a vent pipe member, FIG. 2(A) showing the bubble immediately after being formed following release of the non-condensable gas into the coolant, FIG. 2(B) showing the bubble expanding, FIG. 2(C) showing the bubble approaching the liquid level and FIG. 2(D) showing the bubble exploding in a region of the pool of coolant near the liquid level.
Figure 2C:
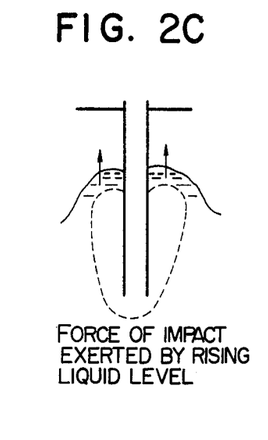
Figure 2D:
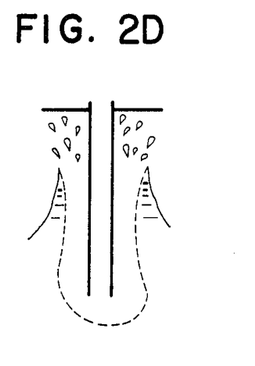

In FIG. 2, there is shown a process in which forces are transiently exerted on the pressure suppressing chamber 14 through vent pipe member 24 in initial stages of the occurrence of an accident involving the escape of a cooling water from the nuclear reactor. The process is shown in chronological sequence in FIGS. 2(A), 2(B), 2(C) and 2(D) in the indicated order. Upon the occurrence of an accident involving the escape of cooling water from the nuclear reactor, air existing in the internal space 17 of the dry well 12 will be forced to pass through the vent pipe member 24 and released into the pool of cooling water 13 through the exhaust port 26 to form an air bubble 27. The internal pressure of the air bubble 27 is equal to a pressure $P_D$ in the internal space 17 of the pressure suppressing chamber 14. The force of the high pressure $P_D$ is exerted on the bottom of the pressure suppressing chamber 14 in the form of a downwardly directed pressure $P_L$. The air bubble 27 formed in the cooling water 13 begins to float upwardly while expanding [FIG. 2(B)]. This causes the liquid level 21 of the coolant 13 to slightly rise, thereby reducing the volume of the space 22. This results in a gradual increase in an upwardly directed pressure $P_U$ applied to the dry well floor 15. By and by, the air bubble 27 rises to a region of the pool of cooling water 13 near the liquid level 21 while raising the liquid level 21 as shown in FIG. 2(C). At this time, the upwardly directed pressure $P_U$ applied to the dry well floor 15 is maximized in intensity. With the air bubble 27 exploding as shown in FIG. 2(d), the upwardly directed pressure $P_U$ is reduced in intensity.

In a conventional containment vessel for a nuclear reactor, there is the disadvantage of forces of high intensity being suddenly exerted on upper and lower walls of the pressure suppressing chamber 14 in initial stages of the occurrence of an accident involving the escape of a cooling liquid from the nuclear reactor, since the vent pipe members are all constructed and arranged such that submerged portions thereof interposed between the liquid level 21 and the exhaust ports of the vent pipe members are equal to one another in length.

Figure 1:
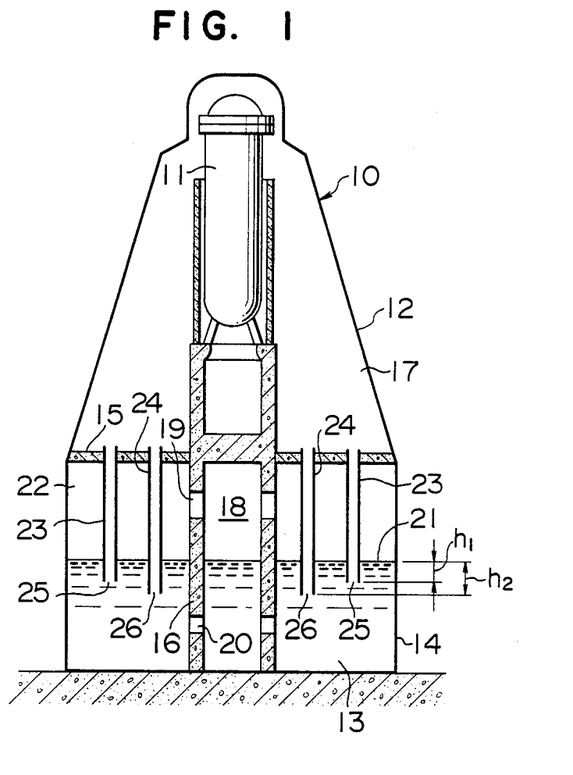
FIG. 1 is a vertical sectional view of the containment vessel for a nuclear reactor comprising one embodiment of the invention.
Figure 3:
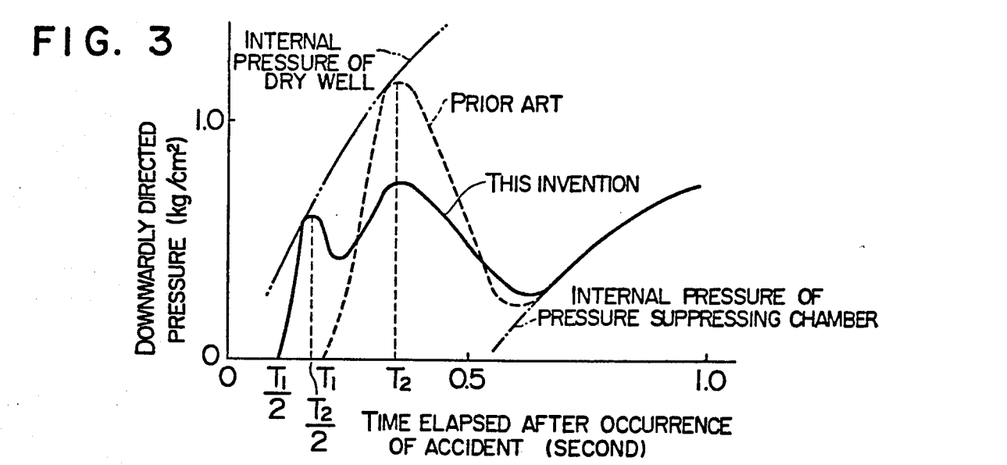
FIG. 3 is a graph showing changes in the downwardly directed pressure in relation to the time elapsed after the occurrence of an accident in the prior art and the embodiment of the invention shown in FIG. 1.
Figure 4:
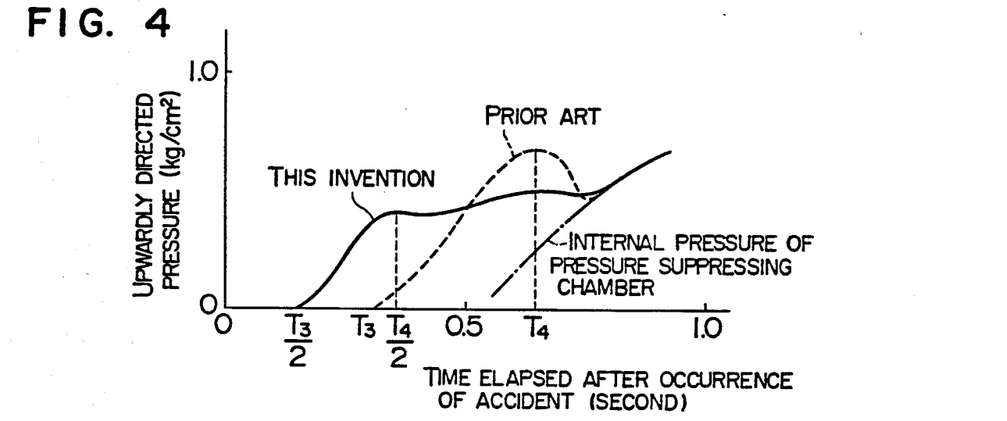
FIG. 4 is a graph showing changes in the upwardly directed pressure in relation to the time elapsed after the occurrence of an accident in the prior art and the embodiment of the invention shown in FIG. 1.

Let us assume that, in the containment vessel constructed as shown in FIG. 1, all the vent pipe members are of one type and submerged portions thereof extending from the liquid level 21 to the exhaust ports of the vent pipe members have a length $h_2$ like that of the vent pipe members 24. Then, changes occur in chronological sequence in the total downwardly directed pressure $P_L$ and the total upwardly directed pressure $P_U$, which are applied to the lower and upper walls of the pressure suppressing chamber 14, as shown in FIG. 3 and FIG. 4 respectively. The total downwardly directed force $P_L$ begins to act in about 0.2 second ($T_1$) after the occurrence of an accident involving the escape of coolant from a reactor, and the action reaches a highest level in about 0.35 second ($T_2$). On the other hand, the total upwardly directed force $P_U$ begins to act in about 0.3 second ($T_3$) and the action reaches a highest level in about 0.65 second ($T_4$). It has been ascertained that such a sudden increase in the intensity of the total upwardly directed force $P_U$ and the total downwardly directed force $P_U$ has detrimental effects on the safety of the containment vessel of a nuclear reactor.

As aforementioned, the vent pipe members according to the invention are divided into a plurality of groups in such a manner that the vent pipe members of different groups differ from one another in the length of portions thereof submerged in the pool of cooling water. In the containment vessel constructed as aforementioned, air to be vented from the internal space 17 of the dry well 12 through the exhaust ports of the vent pipe members in initial stages of an accident involving the escape of coolant from the reactor is first released through the exhaust ports 25 of the vent pipe members 23 of an under-water length $h_1$. The air is then released, after a slight time lag, through the exhaust ports 26 of the vent pipe members 24 of an under-water length $h_2$. The total downwardly directed pressure $P_L$ and the total upwardly directed pressure $P_U$ applied to the bottom wall and the top wall respectively are shown in solid line curves in FIGS. 3 and 4.

More specifically, release of the air bubbles 27 through the exhaust ports 25 are initiated after a lapse of time $T_1/2$ following the occurrence of an accident involving the escape of coolant from the reactor, and the total downwardly directed pressure $P_L$ begins to be applied to the bottom wall of the pressure suppressing chamber 14. The total downwardly directed pressure $P_L$ attains a first maximum value after a lapse of time $T_2/2$ following the occurrence of the accident. As the air bubbles 27 released through the exhaust ports 25 begin to expand and float upwardly, the total upwardly directed pressure $P_U$ begins to act after a lapse of time $T_3/2$ following the occurrence of the accident, attaining a first maximum value after a lapse of time $T_4/2$ following the occurrence of the accident.

Release of the air bubbles 27 through the exhaust ports 26 takes place after release of the air bubbles 27 through the exhaust ports 25. That is, owing to the release of air bubbles 27 through the exhaust ports 26, the total downwardly directed force $P_L$ attains a second maximum value after lapse of time $T_2$ following the occurrence of the accident. After a lapse of time $T_4$, the total upwardly directed pressure $P_U$ attains a second maximum value. It will be seen that according to the present invention it is possible to markedly reduce the maximum values of the total upwardly directed pressure $P_U$ and the total downwardly directed pressure $P_L$ which are produced in initial stages of the occurrence of an accident involving the escape of coolant from a nuclear reactor, as compared with the corresponding values in the prior art. In the embodiment shown and described above, the vent pipe members are divided into two groups, one group of vent pipe members having an underwater length $h_1$ and the other group having an underwater length $h_2$. It is to be understood that the vent pipe members may be divided into three or more groups. It is also to be understood that the ratio of the underwater length of one group to that of another group need not be constant with respect to all the groups.

Figure 5:
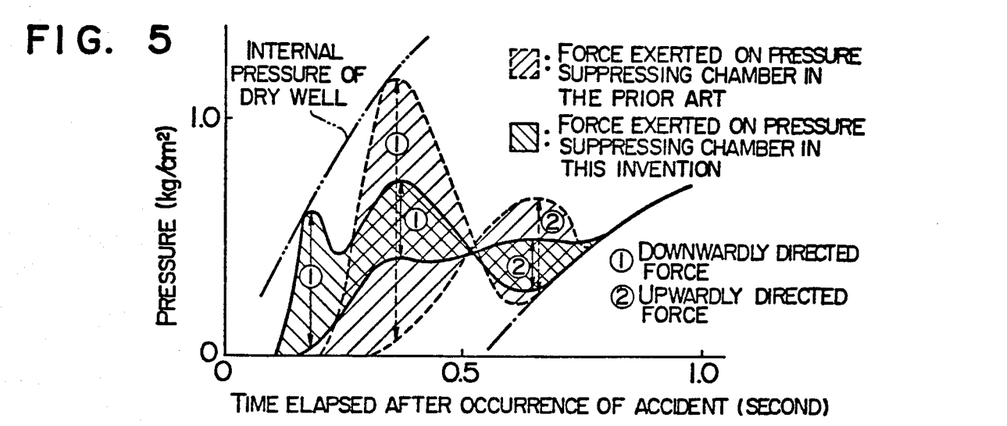
FIG. 5 is a graph showing changes in the pressure applied to the pressure suppressing chamber in relation to the time elapsed after the occurrence of an accident in the prior art and the embodiment shown in FIG. 1.

In the embodiment shown and described, time $T_4$ is about twice time $T_2$ by virtue of the arrangement that $h_2$ has a value twice that of $h_1$. This enables the following unexpected result to be achieved. FIG. 5 shows the behavior of the total upwardly directed force $P_U$ and the total downwardly directed force $P_L$ in relation to the time elapsed after the occurrence of the accident. The net total pressure applied to the pressure suppressing chamber 14 is a pressure equal to the difference between the total upwardly directed pressure and the total downwardly directed pressure. When $P_U - P_L < 0$, pressure is applied downwardly to the pressure suppressing chamber 14; when $P_U - P_L > 0$, pressure is applied upwardly thereto. By arranging that $h_1 : h_2 = 1:2$, it is possible to make the time at which the total downwardly directed pressure $P_L$ attains its second maximum value to substantially coincide with the time at which the total upwardly directed pressure $P_U$ attains its first maximum value. Thus the net pressure applied to the pressure suppressing chamber 14 can be further reduced.

The effect of causing the maximum value of the total downwardly directed pressure $P_L$ and the maximum value of the total upwardly directed pressure $P_U$ to cancel each other out, which is achieved by utilizing the fact that $T_4$ is about twice $T_2$, can also be achieved when the vent pipe members are divided into three or more groups differing from one another in the length of underwater portions of the pipes. This effect will be described with reference to the case of the vent pipe members being divided into three groups, for example. If the lengths of the underwater portions of three groups of vent pipe members extending from the liquid level 21 to the exhaust ports of the pipes are denoted by $h_1$, $h_2$ and $h_3$ by starting from the shortest length group, the relation, for example, $h_1 : h_2 : h_3 = 1:2:3$ will have to be satisfied in order that the time at which the total upwardly directed pressure attains a maximum value may coincide with the time at which the total downwardly directed pressure attain a maximum value.

Generally, when the vent pipe members are divided into m groups in such a manner that the submerged portions of the vent pipe members of different lengths, some of the maximum values of the total downwardly directed pressure $P_L$ and the total upwardly directed pressure $P_U$ can be made to be attained substantially at the same time and consequently to cancel each other out, if $h_n$, which is the nth length of the underwater portions of the pipes starting from the shortest length group $h_1$, is determined by using the following equation:

$$h_n = h_1 + (n-1)\Delta h$$

where $\Delta h = h_1$ when $m = 2$, and $\Delta h = (h_m - h_1)/(m - 1)$ but $\Delta h \leq h_1$ when $m \geq 3$.

Figure 6:
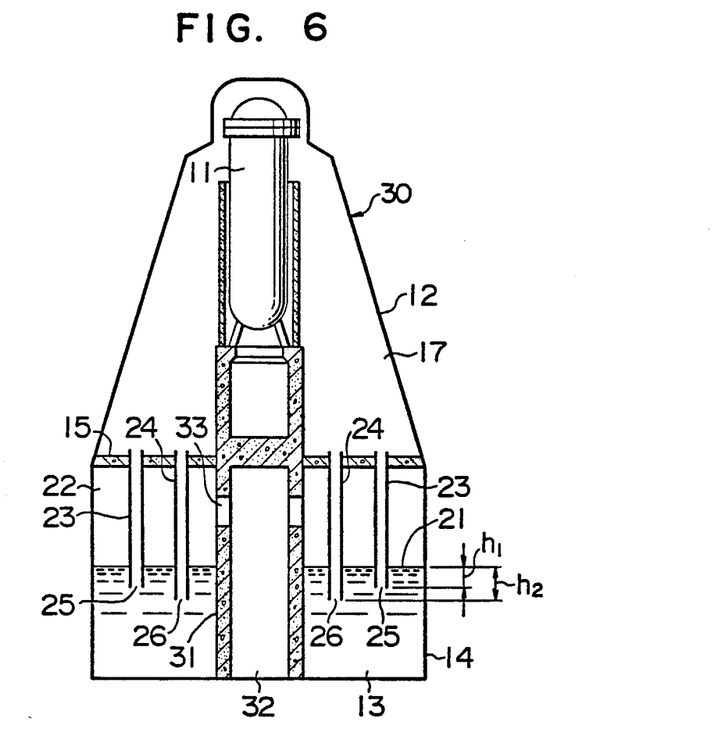
FIG. 6 is a vertical sectional view of the containment vessel for a nuclear reactor comprising another embodiment of the invention.
Figure 7:
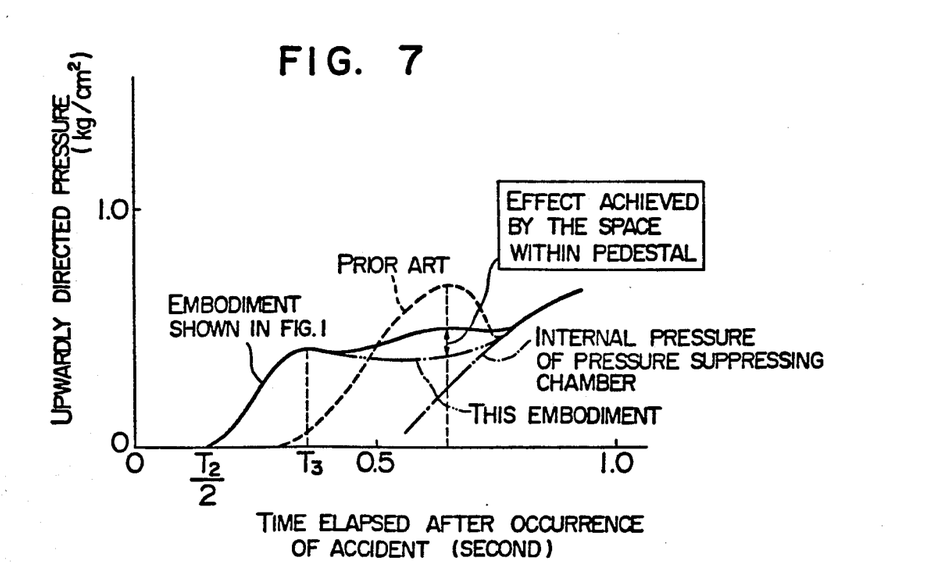
FIG. 7 is a graph showing changes in the upwardly directed pressure in relation to the time elapsed after the occurrence of an accident in the prior art and the embodiments of the invention shown in FIG. 1 and FIG. 6.

FIG. 6 shows another embodiment of the invention. Parts shown in FIG. 6 which are similar or equivalent to the parts shown in FIG. 1 are designated by like reference characters and their description will be omitted. Description will only be made of parts in FIG. 6 which differ from the parts shown in FIG. 1. A containment vessel 30 for a nuclear reactor shown in FIG. 6 slightly differs from the containment vessel 10 shown in FIG. 1 in the construction of the pedestal. The pedestal 31 which is installed on the bottom of the pressure suppressing chamber 14 extends through the partition or bottom 15 of the dry well 12 into the internal space 17 of the dry well 12 for supporting the pressure vessel 11 containing a nuclear reactor. There is formed in the pedestal 31 an internal space 32 which is separated from the internal space 17 of the dry well 12 in airtight relationship. The internal space 32 of the pedestal 31 is maintained in communication, through at least one opening 33 formed in the pedestal 31, only with the space 22 in the pressure suppressing chamber 14. Thus no cooling water exists inside the space 32. The pedestal 31 of the embodiment shown in FIG. 6 does without the openings 20 formed in the portion of the pedestal 16 which is immersed in the pool of cooling water 13. By this feature, the strength of pedestal 31 can be increased in a manner such that the strength thereof is about 1.5 times the strength of pedestal 16 shown in FIG. 1. Moreover, since the internal space 32 of the pedestal is entirely maintained in communication with the space 22 in the pressure suppressing chamber 14, the volume of the space 22 can be substantially increased. This enables the maximum value of the total upwardly directed pressure $P_U$ produced in the embodiment shown in FIG. 1 to be lowered as indicated by a dash-and-dot curve as shown in FIG. 7.

Figure 8:
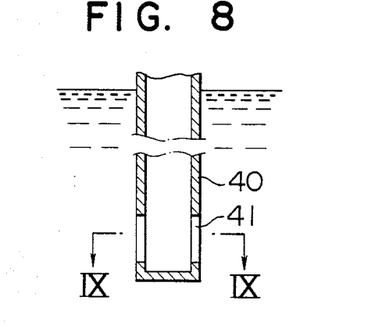
FIG. 8 is a vertical sectional view of a vent pipe member showing one form of the exhaust ports disposed at the lower end portion of the pipe member.
Figure 9:
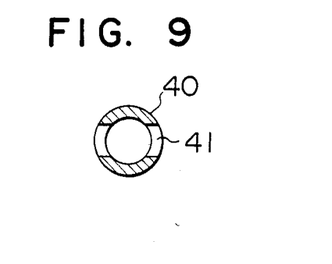
FIG. 9 is a sectional view taken along the line IX—IX of FIG. 8.
Figures 10, 11:
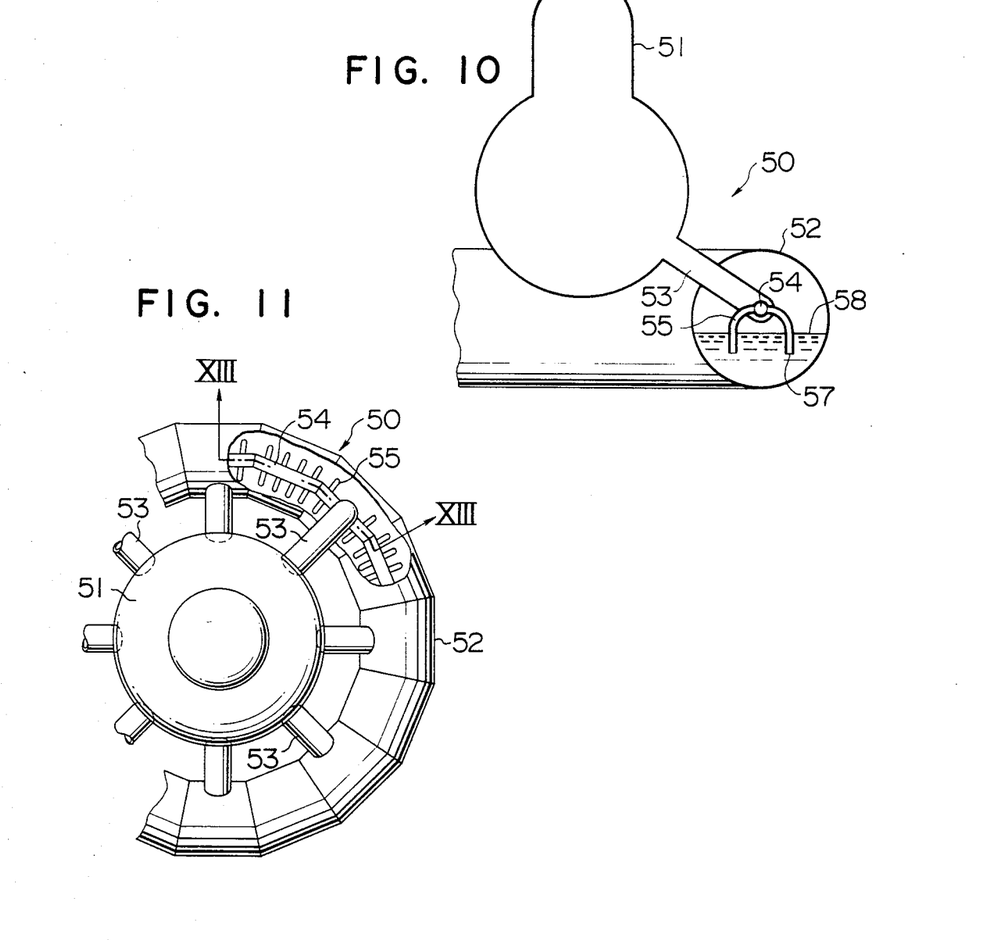
FIG. 10 is an elevation, with certain parts being shown in section, of a nuclear reactor containment vessel of the light-bulb type (Mark-I type) in which this invention is incorporated.
FIG. 11 is a plan view, with certain parts being shown in section, of the nuclear reactor containment vessel shown in FIG. 10.
Figure 12:
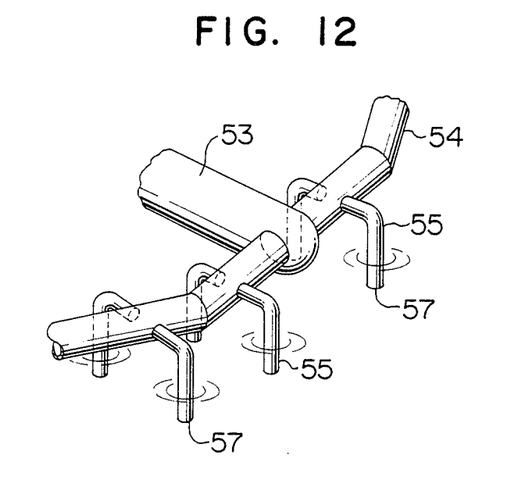
FIG. 12 is a perspective view of the vent pipe members of the embodiment shown in FIGS. 10 and 11.
Figure 13:
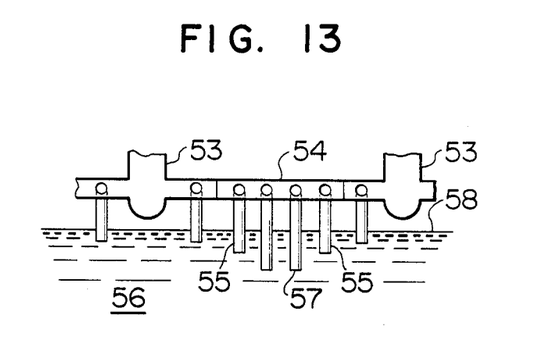
FIG. 13 is a side view as seen from a direction normal to the line XIII—XIII of FIG. 11.

In the embodiments shown in FIGS. 1 and 6, the vent pipe members have been described as each being formed with an exhaust port disposed at the lower end thereof. It is to be understood, however, that the invention is not limited to this form of exhaust port, and that each vent pipe member 40 may be formed, as shown in FIGS. 8 and 9, with a pair of exhaust ports 41 which are disposed in diametrically opposed positions in a wall of the pipe member. It has been ascertained that the phenomenon shown in FIG. 2 also takes place when each vent pipe members has two exhaust ports as aforesaid. It has also been ascertained that, when the vent pipe members are divided into a plurality of groups differing from one another in the length of submerged portions of the vent pipe members, the total upwardly directed pressure $P_U$ and the total downwardly directed pressure $P_L$ can be made to have a plurality of maximum values of low level in place of a single maximum value of high level as shown in FIGS. 3, 4 and 5, and that it is possible to cause the maximum values of the upwardly directed pressures and the downwardly directed pressures of the different groups of vent pipe members to cancel each other out in case $h_n = h_1 + (n-1)\Delta h$ as above-mentioned.

The vent pipe members of different groups having submerged portions of different lengths are preferably arranged symmetrically with respect to the center line of the pedestal 16 (31) as shown in FIG. 1 (FIG. 6). By this arrangement, it is possible to balance the containment vessel horizontally when the downwardly directed pressures $P_L$ and the upwardly directed pressures $P_U$ are applied to the bottom wall and the top wall respectively of the pressure suppressing chamber 14.

The embodiments shown and described above concerns a containment vessel of an over-under type (Mark-II type) for a nuclear reactor. The present invention can also have application in other types of containment vessels including a similar vent pipe device.

FIG. 10 to FIG. 13 show an embodiment of the invention as applied to a containment vessel of a lightbulb type (Mark-I type) for a nuclear reactor. As shown, a containment vessel 50 for a nuclear reactor comprises a gourd-shaped dry well 51 having mounted therein a pressure vessel (not shown) containing a nuclear reactor, and an annular pressure suppressing chamber 52 disposed below the dry well 51 and arranged in surrounding relation therewith. The dry well 51 is connected to the annular pressure suppressing chamber 52 through a plurality of vent pipe members 53 each connected at one end to the dry well 51 and extending at the other end portion into the interior of the pressure suppressing chamber 52. An annular ring header 54 is arranged within the annular pressure suppressing chamber 52 and connected to the vent pipe members 53 at the other end of the latter to maintain communication between the ring header 54 and the dry well 51. A plurality of bent pipe downcomers 55 constituting each of the vent pipe members 53 are connected at one end thereof to the ring header 54 and extend downwardly from the ring header 54 into a pool of cooling water 56 contained in the pressure suppressing chamber 52. Each of the vent pipe downcomers 55 is formed at its lower end with an exhaust port 57 which is similar to the exhaust port shown in FIGS. 1 and 6. Each of the vent pipe downcomers 55 may be formed with a pair of exhaust ports disposed in diametrically opposed positions in a wall of the downcomer near its lower end. Thus the interior of the dry well 51 communicates with the pool of cooling water 56 through the vent pipe downcomers 55.

The vent pipe members 53 of this embodiment are also divided into a plurality of groups, like those of the embodiments described with reference to FIGS. 1 and 6, in such a manner that the vent pipe downcomers 55 of different groups differ from one another in the length of submerged portions of the downcomers extending from a liquid surface 58 of the cooling water 56 to the exhaust ports 57 of the downcomers 55, in order that the total downwardly directed pressure $P_L$ and the total upwardly directed pressure $P_U$ may have a plurality of maximum values of low level in place of a single maximum value of high level. Preferably, the vent pipe members 53 are divided into m groups so that the submerged portions of the vent pipe downcomers 55 may have different lengths which are m in number, and the length $h_n$ of the submerged portions of the downcomers 55 which belong to the nth group starting from the shortest submerged length $h_1$ group is determined by using the following equation:

$$h_n = h_1 + (n-1)\Delta h$$

where $\Delta h = h_1$ when $m=2$, and $\Delta h = (h_m - h_1)/(m-1)$ but $\Delta h \leq h_1$ when $m \geq 3$.

By dividing the downcomers 55 into a plurality of groups differing from one another in the length of submerged portions thereof, it is possible to cause the maximum values of the upwardly directed pressures and the downwardly directed pressures to cancel each other out, in the same manner as described with reference to the embodiments shown in FIGS. 1 and 6. Consequently, this arrangement makes it possible to suppress impact which would otherwise be applied to the pressure suppressing chamber 52 by air bubbles formed in the pool of cooling water 56 by non-condensable gas which passes from the dry well 51 through the vent pipe downcomers 55 in initial stages of occurrence of an accident involving the escape of coolant from the nuclear reactor, thereby enhancing the safety of the containment vessel 50 for a nuclear reactor.

What is claimed is:

1. A containment vessel for a nuclear reactor comprising a dry well mounting therein a pressure vessel containing the nuclear reactor and having a vertically extending center line, non-condensable gases normally being present in an internal space of said dry well, a pressure suppression chamber annularly arranged to surround the center line of said pressure vessel and containing a pool of coolant, a partition separating said dry well from said pressure suppressing chamber, a pedestal extending from said pressure suppressing chamber through said partition into said dry well for supporting within said dry well said pressure vessel containing said nuclear reactor, and vent pipe means for releasing therethrough into said pool of coolant within said pressure suppression chamber steam which will be discharged from said pressure vessel into the internal space of said dry well as a result of an accident, said vent pipe means comprising a plurality of separated and individually mounted vent pipe members each inserted into said pool of coolant and having at least one exhaust port opening in said pool of coolant, said vent pipe members each continuously communicating the internal space of said dry well with said pool of coolant, said vent pipe members each being constructed and arranged such that said at least one exhaust port is immersed in said pool of coolant at all times even if the internal pressure of said dry well becomes lower than the pressure prevailing in a space formed within said pressure suppression chamber and disposed above a liquid level of said pool of coolant, the improvement comprising said vent pipe means being arranged for inhibiting sudden initial increases of pressure in said pressure suppression chamber resulting from transient release of said non-condensable gases into said coolant through said vent pipe means occurring as a result of an accident and enabling the pressures applied to walls of said pressure suppression chamber due to the transient release of said non-condensable gases to become balanced about the center line of said pressure vessel, said vent pipe members of said vent pipe means being divided into a plurality of groups in such a manner that said vent pipe members of different groups differ from one another in the length of submerged portions of said vent pipe members interposed between the liquid level of said pool of coolant within said pressure suppression chamber and said at least one exhaust port of said vent pipe members for inhibiting sudden initial increases of pressure in said pressure suppression chamber resulting from the transient release of said non-condensable gases into said coolant through said vent pipe members occurring as a result of an accident, said vent pipe members of said vent pipe means being arranged in said pressure suppression chamber in such a manner that the pressures applied to the walls of said pressure suppression chamber due to the transient release of said non-condensable gases become balanced about the center line of said pressure vessel, and communicating means for permitting an internal spaced formed in said pedestal to communicate only with said space formed in said pressure suppressing chamber and disposed above the liquid level of said pool of coolant.

2. A containment vessel for a nuclear reactor as claimed in claim 1, wherein the length $h_n$ of the submerged portions of said vent pipe members between the liquid level of said pool of coolant and the exhaust ports of said vent pipe members, which length is in the nth order by starting from the pipes of the shortest submerged length $h_1$ is determined by using the following equation:

$$h_n = h_1 + (n-1)\Delta h$$

where $\Delta h = h_1$ when said vent pipe members are divided into 2 groups, and $\Delta h = (h_m - h_1)/(m-1)$ but $\Delta h \leq h_1$ when said vent pipe members are divided into m more than 2 groups.

3. A containment vessel for a nuclear reactor comprising a dry well mounting therein a pressure vessel containing the nuclear reactor and having a vertically extending center line, non-condensable gases normally being present in an internal space of said dry well, a pressure suppression chamber annularly arranged to surround the center line of said pressure vessel and containing a pool of coolant, a partition separating said dry well from said pressure suppressing chamber, a pedestal extending from said pressure suppressing chamber through said partition into said dry well for supporting within said dry well said pressure vessel containing said nuclear reactor, and vent pipe means for releasing therethrough into said pool of coolant within said pressure suppression chamber steam which will be discharged from said pressure vessel into the internal space of said dry well as a result of an accident, said vent pipe means comprising a plurality of separated and individually mounted vent pipe members each inserted into said pool of coolant and having at least one exhaust port opening in said pool of coolant, said vent pipe members each continuously communicating the internal space of said dry well with said pool of coolant, said vent pipe members each being constructed and arranged such that said at least one exhaust port is immersed in said pool of coolant at all times even if the internal pressure of said dry well becomes lower than the pressure prevailing in a space formed within said pressure suppression chamber and disposed above a liquid level of said pool of coolant, the improvement comprising said vent pipe means being arranged for inhibiting sudden initial increases of pressure in said pressure suppression chamber resulting from transient release of said non-condensable gases into said coolant through said vent pipe means occurring as a result of an accident and enabling the pressures applied to walls of said pressure suppression chamber due to the transient release of said non-condensable gases to become balanced about the center line of said pressure vessel, said vent pipe members of said vent pipe means being divided into a plurality of groups in such a manner that said vent pipe members of different groups differ from one another in the length of submerged portions of said vent pipe members interposed between the liquid level of said pool of coolant within said pressure suppression chamber and said at least one exhaust port of said vent pipe members for inhibiting sudden initial increases of pressure in said pressure suppression chamber resulting from the transient release of said non-condensable gases into said coolant through said vent pipe members occurring as a result of an accident, said vent pipe members of said vent pipe means being arranged in said pressure suppression chamber in such a manner that the pressures applied to the walls of said pressure suppression chamber due to the transient release of said non-condensable gases become balanced about the center line of said pressure vessel, the length $h_n$ of the submerged portions of said vent pipe members between the liquid level of said pool of coolant and the exhaust ports of said vent pipe members, which length is in the nth order by starting from the pipes of the shortest submerged length $h_1$ is determined by using the following equation:

$$h_n = h_1 + (n-1)\Delta h$$

where $\Delta h = h_1$ when said vent pipe members are divided into 2 groups, and $\Delta h = (h_m - h_1)/(m-1)$ but $\Delta h \leq h_1$ when said vent pipe members are divided into m more than 2 groups, and communicating means for permitting an internal space formed in said pedestal to communicate only with said space formed in said pressure suppressing chamber and disposed above the liquid level of said pool of coolant.

4. A containment vessel for a nuclear reactor as claimed in claim 1, wherein each of said vent pipe members is formed with an exhaust port at a lower end thereof.

5. A containment vessel for a nuclear reactor as claimed in claim 1, wherein each of said vent pipe members is formed with a pair of exhaust ports disposed in diametrically opposed positions in a side wall near a lower end thereof.

6. A containment vessel for a nuclear reactor as claimed in claim 1, wherein said vent pipe members of a plurality of groups having submerged portions of different lengths interposed between the liquid level of said pool of coolant in the pressure suppressing chamber and the lower ends of the vent pipe members are disposed symmetrically with respect to the center line of said pedestal.

7. A containment vessel for a nuclear reactor comprising a dry well for mounting therein a pressure vessel containing the nuclear reactor, a pressure suppressing chamber having a pool of coolant therein, a partition separating said dry well from said pressure suppressing chamber, a pedestal extending from said pressure suppressing chamber through said partition into said dry well for supporting within the dry well the pressure vessel containing the nuclear reactor, and a plurality of separated and individually mounted vent pipe members for releasing therethrough into said pool of coolant in said pressure suppressing chamber steam which will be generated in said dry well when an accident occurs and, said vent pipe members being inserted in said pool of coolant in said pressure suppressing chamber and each having at least one exhaust port opening in said pool of coolant, said vent pipe members each being constructed and arranged such that said exhaust port is immersed in said pool of coolant at all times even if the internal pressure of said dry well becomes lower than the pressure prevailing in a space formed in said pressure suppressing chamber and disposed above a liquid level of said pool of coolant, wherein the improvement comprises the arrangement whereby said separated and individually mounted vent pipe members are divided into a plurality of groups in such a manner that the separated and individually mounted vent pipe members of different groups differ from one another in the length of submerged portions of the vent pipe members interposed between the liquid level of the pool of coolant within the pressure suppressing chamber and the exhaust ports of the vent pipe members, wherein the length $h_n$ of the submerged portions of the vent pipe members between the liquid level of said pool of coolant and the exhaust ports of the vent pipe members, which length is in the nth order by starting from the pipes of the shortest submerged length $h_1$ is determined by using the following equation:

$$h_n = h_1 + (n-1)\Delta h$$

where $\Delta h = h_1$ when the vent pipe members are divided into two groups, and $\Delta h = (h_m - h_1)/(m-1)$ but $\Delta h \leqq h_1$ when the vent pipe members are divided into m more than two groups, and further comprising communicating means for permitting an internal space formed in said pedestal to communicate only with said space formed in said pressure suppressing chamber and disposed above the liquid level of said pool of coolant.

8. A containment vessel for a nuclear reactor as claimed in claim 7, wherein each of said vent pipe members is formed with an exhaust port at a lower end thereof.

9. A containment vessel for a nuclear reactor as claimed in claim 7, wherein each of said vent pipe members is formed with a pair of exhaust ports disposed in diametrically opposed positions in a side wall near a lower end thereof.

* * * * *